(12) United States Patent
Wang et al.

(10) Patent No.: US 8,401,017 B2
(45) Date of Patent: Mar. 19, 2013

(54) WIRELESS COMMUNICATION NETWORK USING AN ENHANCED RLC STATUS PDU FORMAT

(75) Inventors: Chung-Shan Wang, Sinfong Township, Hsinchu County (TW); Chunli Wu, Beijing (CN); Tsung-Liang Lu, Taipei (TW)

(73) Assignee: Sunplus mMobile Inc., Hsinchu Science Park (TW)

( * ) Notice: Subject to any disclaimer, the term of this patent is extended or adjusted under 35 U.S.C. 154(b) by 1076 days.

(21) Appl. No.: 12/318,506

(22) Filed: Dec. 30, 2008

(65) Prior Publication Data

US 2009/0175206 A1 Jul. 9, 2009

Related U.S. Application Data

(60) Provisional application No. 61/006,249, filed on Jan. 3, 2008.

(51) Int. Cl.
*H04L 12/28* (2006.01)
*H04B 7/00* (2006.01)

(52) U.S. Cl. ........................................ 370/394; 370/310

(58) Field of Classification Search .................... 370/394
See application file for complete search history.

(56) References Cited

U.S. PATENT DOCUMENTS

| | | | |
|---|---|---|---|
| 6,772,215 B1 * | 8/2004 | Rathonyi et al. | 709/230 |
| 2008/0212561 A1 * | 9/2008 | Pani et al. | 370/346 |
| 2009/0190480 A1 * | 7/2009 | Sammour et al. | 370/242 |
| 2010/0014446 A1 * | 1/2010 | Chun et al. | 370/310 |
| 2010/0014466 A1 * | 1/2010 | Meyer et al. | 370/328 |
| 2010/0322155 A1 * | 12/2010 | Meyer et al. | 370/328 |
| 2011/0041024 A1 * | 2/2011 | Burbidge et al. | 714/749 |

OTHER PUBLICATIONS

3rd Generation Partnership Project; Technical Specification Group Radio Access Network; Evolved Universal Terrestrial Radio Access (E-UTRA) Radio Link Control (RLC) protocol specification (Release 8).*

3rd Generation Partnership Project; Technical Specification Group Radio Access Network (Dec. 2007); Evolved Universal Terrestrial Radio Access (E-UTRA) Radio Link Control (RLC) protocol specification (Release 8). Asterisk.*

* cited by examiner

*Primary Examiner* — Kenny Lin
*Assistant Examiner* — Shaq Taha
(74) *Attorney, Agent, or Firm* — Bacon & Thomas, PLLC

(57) ABSTRACT

An enhanced RLC STATUS PDU format is used in a wireless communication network in which a sender transmits AMD PDUs to a receiver, and the receiver responds a STATUS PDU. In the STATUS PDU, an ACK_SN field is provided for indicating the SN of a next not received AMD PDU which is not reported as missing in the STATUS PDU, and an E1 field is provided for indicating whether a set of NACK_SN, E1, and E2 fields follows or not. The NACK_SN field indicates a AMD PDU that has been detected as lost at the receiver. The E2 field indicates whether a set of SOstart, SOend, and E2 fields follows or not. The SOstart field indicates the first byte in the AMD PDU with SN=NACK_SN that has been detected as lost. The SOend field indicates the last byte in the AMD PDU with SN=NACK_SN that has been detected as lost.

12 Claims, 3 Drawing Sheets

| E1 | Definition |
|---|---|
| 00 | A set of NACK_SN, E1 and E2 fields does not follow |
| 01 | Bitmap follows |
| 10 | A set of NACK_SN, Nr_NACK_PDU and E1 fields follows |
| 11 | A set of NACK_SN, E1 and E2 fields follows |

WIRELESS COMMUNICATION NETWORK USING AN ENHANCED RLC STATUS PDU FORMAT

CROSS-REFERENCE TO RELATED APPLICATION

This application claims the benefit of the filing date of U.S. Provisional Application Ser. No. 61/006,249, entitled "ENHANCED RLC STATUS PDU FORMAT" filed Jan. 3, 2008 under 35 USC & 119(e)(1).

BACKGROUND OF THE INVENTION

1. Field of the Invention

This invention relates generally to a radio link control (RLC) status protocol data unit (PDU) format and, more particularly, to an enhanced RLC STATUS PDU format for use in a wireless communication network.

2. Description of Related Art

In current UMTS RLC specification, STATUS PDUs are specified to inform the sender RLC entity the acknowledgment information of the RLC AMD (Acknowledge Mode Data) PDUs received at the receiver peer entity. Based on the information, the sender decides to retransmit the negative acknowledged PDUs or to move its transmission window forward based on the procedure specified in the specification. The STATUS PDU could be event triggered or triggered based on the specified timer. The transmission of STATUS PDU should be on time in order to avoid the deadlock/stall situation of the transmission window at the sender peer entity.

In current E-UTRA RLC specification, segmentation of the RLC PDU is introduced. As shown in FIG. 1, the current format of the STATUS PDU consists of a STATUS PDU payload 11 and a RLC control PDU header 12. The RLC control PDU header 12 consists of a D/C field and a CPT field. The STATUS PDU payload 11 starts from the first bit following the RLC control PDU header 12, and it consists of one ACK_SN field and one E1 field, zero or more sets of a NACK_SN field, an E1 field and an E2 field, and possibly a set of an SOstart field and an SOend field for each NACK_SN, wherein the set of header combined with E1, E2, NACK_SN, SOstart, and SOend fields is used to indicate the missing segment of the AMD PDU. The descriptions of the fields are as follows:

D/C Field (Length=1 bit)

The D/C field indicates the type of PDU. Specifically, the PDU is a AMD PDU when D/C field=0, and the PDU is a control PDU when D/C field=1.

CPT Field (Length=3 Bits)

The CPT field indicates the type of control PDU. Currently, it is specified that the control PDU is a STATUS PDU when CPT field is 000.

Acknowledgement SN (ACK_SN) Field (Length=10 bits):

The ACK_SN field indicates the SN (sequence number) of the next not received AMD PDU which is not reported as missing in the STATUS PDU. When the transmitting side of an AM RLC entity receives a STATUS PDU, it interprets that all AMD PDUs up to but not including the AMD PDU with SN=ACK_SN have been received by its AM RLC entity, excluding those AMD PDUs indicated in the STATUS PDU with NACK_SN and portions of AMD PDUs indicated in the STATUS PDU with NACK_SN, SOstart and Soend.

Extension Bit 1 (E1) Field (Length=1 Bit):

The interpretation of the E1 field is to indicate that a set of NACK_SN, E1 and E2 does not follow when E1 is 0, and to indicate that a set of NACK_SN, E1 and E2 does follow when E1 is 1.

Negative Acknowledgement SN (NACK_SN) Field (Length=10 Bits)

The NACK_SN field indicates the SN of the AMD PDU (or portions of it) that has been detected as lost at the receiver.

Extension Bit 1 (E1) Field that Follows the Aforementioned E1 Field of 1

Extension Bit 2 (E2) Field (Length=1 Bit)

The interpretation of the E2 field is to indicate a set of SOstart and SOend does not follow when E2 is 0, and indicate a set of SOstart and SOend does follow when E2 is 1.

SO (Segmentation Offset) Start (SOstart) Field (Length=15 Bits)

The SOstart field (together with the SOend field) indicates the portion of the AMD PDU with SN=NACK_SN (the NACK_SN for which the SOstart is related to) that has been detected as lost at the receiving side of the AM RLC entity. Specifically, the SOstart field indicates the position of the first byte of the portion of the AMD PDU in bytes within the data field of the AMD PDU.

SO End (SOend) Field (Length=15 Bits)

The SOend field (together with the SOstart field) indicates the portion of the AMD PDU with SN=NACK_SN (the NACK_SN for which the SOend is related to) that has been detected as lost at the receiver. Specifically, the SOend field indicates the position of the last byte of the portion of the AMD PDU in bytes within the data field of the AMD PDU. A special SOend value "111111111111111" is used to indicate that the missing portion of the AMD PDU includes all bytes to the last byte of the AMD PDU.

With the above STATUS PDU format, the receiver RLC entity may inform the sender RLC entity the acknowledgment information of the RLC AMD PDUs received at the receiver. For example, when a sender transmits ten AMD PDUs with SN=1 to 10 to a receiver and the AMD PDU with SN=2 and the 10-40 bytes portion of the AMD PDU with SN=3 are not received at the receiver, the receiver will respond a STATUS PDU as follows for indicating the missing of AMD PDU:

D/C=1
CPT=000
ACK_SN=1
E1=1
- - - indicating missing PDU with SN=2
NACK_SN=2
E1=1
E2=0
- - - indicating missing 10-40 bytes of PDU with SN=3
NACK_SN=3
E1=0
E2=1
SOstart=10
SOend=40

Another example is given as follows to further demonstrate the use of the STATUS PDU. A sender transmits ten AMD PDUs with SN=1 to 10 to a receiver and the AMD PDU with SN=2 and the 10-40 bytes portion and 100-120 bytes portion of the AMD PDU with SN=3 are not received at the receiver. The receiver will respond a STATUS PDU as follows for indicating the missing of AMD PDU:

D/C=1
CPT=000
ACK_SN=11
E1=1
- - - indicating missing PDU with SN=2
NACK_SN=2
E1=1
E2=0
- - - indicating missing 10-40 bytes of PDU with SN=3
NACK_SN=3
E1=1
E2=1
SOstart=10
SOend=40
- - - indicating missing 100-120 bytes of PDU with SN=3
NACK_SN=3
E1=0
E2=1
SOstart=100
SOend=120

It can be seen that the aforementioned STATUS PDU may include two identical NACK_SN fields (NACK_SN=3) for indicating the same missing PDU (with SN=3). This causes a bandwidth waste, as duplicated NACK_SN fields are included in the STATUS PDU, which need extra 10 bits of data length. If the number of missing portions of the AMD PDU increases, the number of duplicated NACK_SN fields included in the STATUS PDU also increases, resulting in a serious bandwidth waste.

Therefore, it is desirable to provide an enhanced RLC STATUS PDU format for use in a wireless communication network to mitigate and/or obviate the aforementioned problems.

SUMMARY OF THE INVENTION

The object of the present invention is to provide an enhanced RLC STATUS PDU format for use in a wireless communication network for saving required bandwidth to transmit the acknowledgement information and effectively transmitting the status reporting information.

According to a feature of the invention, there is provided an enhanced RLC (Radio Link Control) STATUS PDU (Protocol Data Unit) format for use in a wireless communication network in which a sender transmits AMD PDUs, each said AMD PDU having an SN (Sequence Number), to a receiver, and the receiver responds a STATUS PDU to the sender for informing acknowledge information of the AMD PDUs received at the receiver. The enhanced RLC STATUS PDU format comprises: an ACK_SN (Acknowledgement SN) field, for indicating the SN of a next AMD PDU which is not received and not reported as missing in the STATUS PDU; and an E1 field, for indicating that a set of NACK_SN (Negative Acknowledgement SN), E1, and E2 fields does not follow when it is a first value, or indicating that the set of NACK_SN, E1, and E2 fields follows when it is a second value. For the set of NACK_SN, E1, and E2 fields that follows the E1 field of second value, the NACK_SN field is provided for indicating the AMD PDU that has been detected as lost at the receiver, and the E2 field is provided for indicating that a set of SOstart, SOend, and E2 fields does not follow for the NACK_SN when it is the first value, or indicating that a set of SOstart, SOend, and E2 fields follows for the NACK_SN when it is the second value. For the set of SOstart, SOend, and E2 fields that follows the E2 field of second value, the SOstart field is provided for indicating a position of the first byte in the portion of the AMD PDU in bytes within a data field of the AMD PDU with SN=NACK_SN, for which the SOstart is related to, that has been detected as lost at the receiver, and the SOend field is provided for indicating a position of the last byte in the portion of the AMD PDU in bytes within a data field of the AMD PDU with SN=NACK_SN, for which the SOend is related to, that has been detected as lost at the receiver.

According to another feature of the invention, there is provided an enhanced RLC STATUS PDU (Protocol Data Unit) format for use in a wireless communication network in which a sender transmits AMD PDUs, each said AMD PDU having an SN to a receiver, and the receiver responds an STATUS PDU to the sender for informing acknowledge information of the AMD PDUs received at the receiver. The enhanced RLC STATUS PDU format comprises: an ACK_SN field, for indicating the SN of a next AMD PDU which is not received and not reported as missing in the STATUS PDU; and an E1 field, for indicating that a set of NACK_SN_Offset, E1, and E2 fields does not follow when it is a first value, or indicating that the set of NACK_SN_Offset, E1, and E2 fields follows when it is a second value. For the set of NACK_SN_Offset, E1, and E2 fields that follows the E1 field of second value, the NACK_SN_Offset field is provided for indicating an offset to the ACK_SN of an AMD PDU that has been detected as lost at the receiver, and the E2 field is provided for indicating that a set of SOstart, SOend, and E2 fields does not follow for the NACK_SN_Offset when it is the first value, or indicating that a set of SOstart, SOend, and E2 fields follows for the NACK_SN Offset when it is the second value. For the set of SOstart, SOend, and E2 fields that follows the E2 field of second value, the SOstart field is provided for indicating a position of the first byte in the portion of the AMD PDU in bytes within a data field of the AMD PDU with SN resulted from ACK_SN and NACK_SN_Offset, for which the SOstart is related to, that has been detected as lost at the receiver, and the SOend field is provided for indicating a position of the last byte in the portion of the AMD PDU in bytes within a data field of the AMD PDU with SN resulted from ACK_SN and NACK_SN_Offset, for which the SOend is related to, that has been detected as lost at the receiver.

According to a further feature of the invention, there is provided an enhanced RLC STATUS PDU format for use in a wireless communication network in which a sender transmits AMD PDUs, each said AMD PDU having a SN, to a receiver, and the receiver responds an STATUS PDU to the sender for informing acknowledge information of the AMD PDUs received at the receiver. The enhanced RLC STATUS PDU format comprises: an ACK_SN field, for indicating the SN of a next AMD PDU which is not received and not reported as missing in the STATUS PDU; and an E1 field, for indicating that a set of NACK_SN, E1 and E2 fields does not follow when it is a first value, indicating that the set of NACK_SN, E1 and E2 fields follows when it is a second value, indicating that a bitmap follows when it is a third value, or indicating that a set of NACK_SN, Nr_NACK_PDU and E1 fields follows when it is a fourth value. For the set of NACK_SN, E1, and E2 fields that follows the E1 field of second value, the NACK_SN field is provided for indicating the AMD PDU that has been detected as lost at the receiver, and the E2 field is provided for indicating that a set of SOstart, SOend, and E2 fields does not follow for the NACK_SN when it is the first value, or indicating that a set of SOstart, SOend, and E2 fields follows for the NACK_SN when it is the second value. For the set of SOstart, SOend, and E2 fields that follows the E2 field of second value, the SOstart field is provided for indicating a position of the first byte in the portion of the AMD PDU in bytes within a data field of the AMD PDU with SN=NACK_SN, for which the SOstart is related to, that has been detected as lost at the receiver, and the SOend field is provided for indicating a position of the last byte in the portion of the AMD PDU in bytes within a data field of the AMD PDU with SN=NACK_SN, for which the SOend is related to, that has been detected as lost at the receiver.

According to still a further feature of the invention, there is provided an enhanced RLC STATUS PDU format for use in a wireless communication network in which a sender transmits-AMD PDUs, each said AMD PDU having an SN to a receiver, and the receiver responds an STATUS PDU to the sender for informing acknowledgement information of the AMD PDUs received at the receiver. The enhanced RLC STATUS PDU format comprises: an ACK_SN field, for indicating the SN of a next AMD PDU which is not received and not reported as missing in the STATUS PDU; and an E1 field, for indicating that a set of F, NACK_SN, and E1 fields does not follow when it is a first value, or indicating that a set of F, NACK_SN, and E1 fields follows when it is a second value. For the set of F, NACK_SN, and E1 fields that follows the E1 field of 1, the F field is provided for indicating that an E2 field follows when it is the first value, or indicating an Nr_NACK_PDU field follows when it is the second value, and the NACK_SN field is provided for indicating the SN of a AMD PDU or a portion thereof that has been detected as lost at the receiver. The E2 field that follows the F field of first value indicates that a set of SOstart, SOend, and E2 fields does not follow for the NACK_SN when it is the first value, or indicates that the set of SOstart, SOend, and E2 fields follows for the NACK_SN when it is the second value. The SOstart field is provided for indicating a position of the first byte in the portion of the AMD PDU in bytes within a data field of the AMD PDU with SN=NACK_SN, for which the SOstart is related to, that has been detected as lost at the receiver. The SOend field is provided for indicating a position of the last byte in the portion of the AMD PDU in bytes within the data field of the AMD PDU with SN=NACK_SN, for which the SOend is related to, that has been detected as lost at the receiver. The Nr_NACK_PDU field that follows the F field of second value indicates the number of consecutive missing AMD PDUs followed from or started from the AMD PDU indicated by the NACK_SN field.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
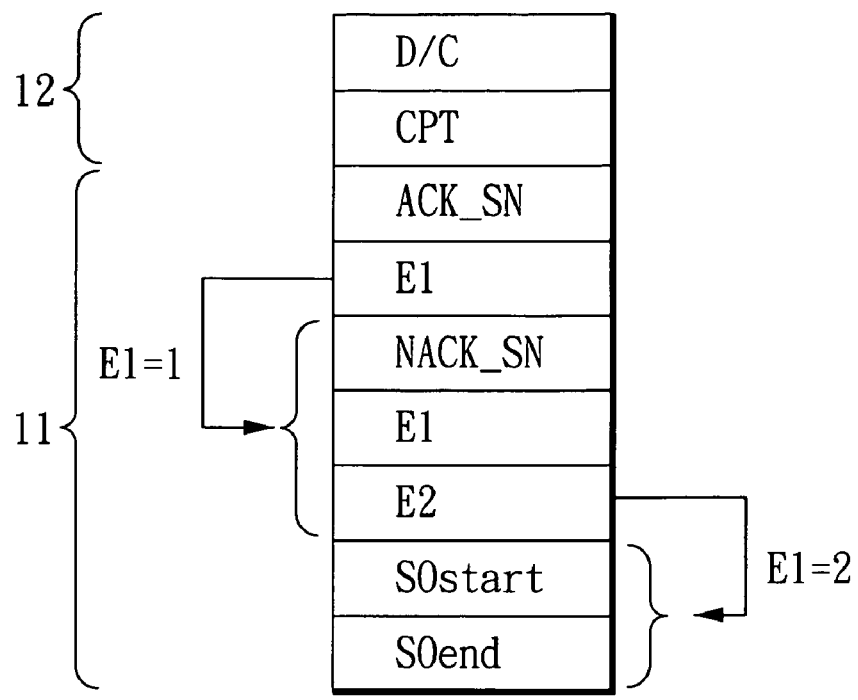
FIG. 1 shows the current format of the STATUS PDU.
Figure 2:
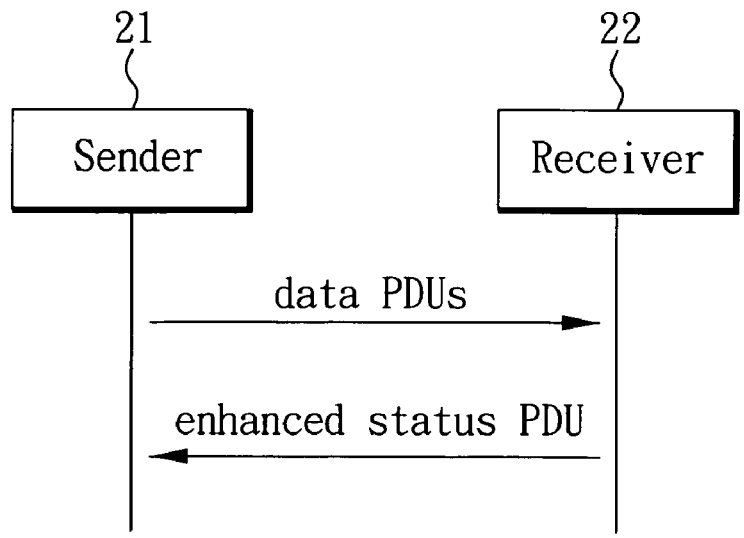
FIG. 2 is a schematic diagram showing that a sender transmits plural AMD PDUs to a receiver and the receiver responds an enhanced STATUS PDU to the sender.

FIG. 2 is a schematic diagram showing that, in a wireless communication network, a sender 21 transmits plural AMD PDUs, each having a SN (Sequence Number), to a receiver 22, and the receiver 22 responds an enhanced STATUS PDU to the sender 21. The enhanced STATUS PDU is employed for informing acknowledgement information of the AMD PDUs received at the receiver 22.

Figures 3A, 3B, 4:
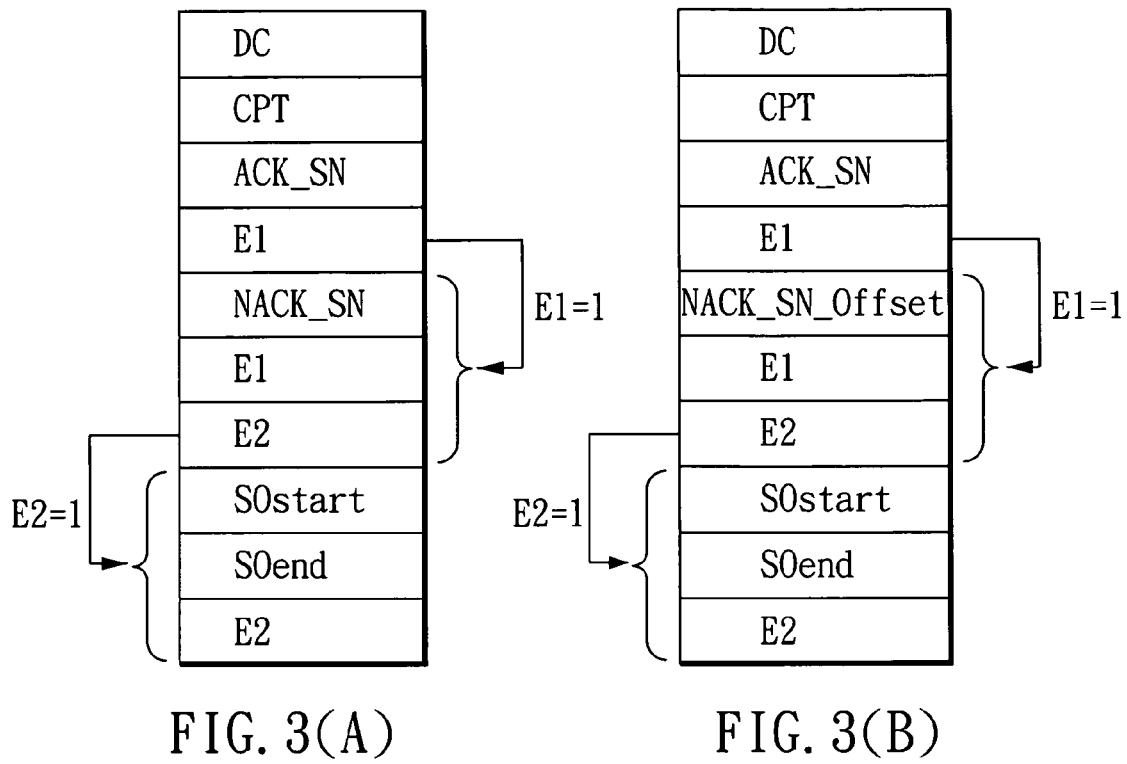
FIG. 3(A) shows the format of the enhanced STATUS PDU in accordance with the present invention.
FIG. 3(B) shows another format of the enhanced STATUS PDU in accordance with the present invention.
FIG. 4 shows the definition of the two-bit E1 field.

FIG. 3(A) shows the format of the enhanced STATUS PDU. As shown, the format of the enhanced STATUS PDU consists of:

a D/C field of length=1 bit for indicating the type of PDU, in which the PDU is a AMD PDU when D/C field=0, and the PDU is a control PDU when D/C field=1;

a CPT field of length=3 bits for indicating the type of control PDU, in which the control PDU is specified as a STATUS PDU when CPT field is 000;

an Acknowledgement SN (ACK_SN) field of length=10 bits for indicating the SN of the next not received AMD PDU which is not reported as missing in the STATUS PDU at the receiver 22, in which when the sender 21 receives a STATUS PDU, it interprets that all AMD PDUs up to but not including the AMD PDU with SN=ACK_SN have been received by the receiver 22, excluding those AMD PDUs indicated in the STATUS PDU with NACK_SN and portions of AMD PDUs indicated in the STATUS PDU with NACK_SN, SOstart and SOend;

an Extension bit 1 (E1) field of length=1 bit for indicating a set of NACK_SN, E1 and E2 fields does not follow when it is 0, and indicating a set of NACK_SN, E1 and E2 fields does follow when it is 1;

a Negative Acknowledgement SN (NACK_SN) field of Length=10 bits for indicating the SN of the AMD PDU (or portions of it) that has been detected as lost at the receiver 22;

an Extension bit 1 (E1) field of length=1 bit which follows the aforementioned E1 field of 1;

an Extension bit 2 (E2) field of length=1 bit for indicating that a set of SOstart, SOend and E2 fields does not follow for this NACK_SN when it is 0, and indicating that a set of SOstart, SOend and E2 fields does follow for this NACK_SN when it is 1;

an SO start (SOstart) field of length=15 bits for indicating the position of the first byte of the missing portion of the AMD PDU in bytes, so that the SOstart field (together with the SOend field) indicates the portion of the AMD PDU with SN=NACK_SN (the NACK_SN for which the SOstart is related to) that has been detected as lost at the receiver 22;

an SO end (SOend) field of length=15 bits for indicating the position of the last byte of the missing portion of the AMD PDU in bytes, so that the SOend field (together with the SOstart field) indicates the portion of the AMD PDU with SN=NACK_SN (the NACK_SN for which the SOend is related to) that has been detected as lost at the receiver 22; and an Extension bit 2 (E2) field of length=1 bit which follows the aforementioned E2 field of 1.

It is to be appreciated that the designated values of the above fields are arbitrary and are presented here in specific values for illustrative purpose only.

With the above enhanced STATUS PDU format, the receiver 22 may inform the sender 21 the acknowledgment information of the AMD PDUs received at the receiver 22. For example, a sender 21 transmits ten AMD PDUs with SN=1 to 10 to a receiver 22 and the AMD PDU with SN=2 and the 10-40 bytes portion and 100-120 bytes portion of the AMD PDU with SN=3 are not received at the receiver 22, the receiver 22 will respond a STATUS PDU as follows for indicating the missing of AMD PDU:

D/C=1
CPT=000
ACK_SN=11
E1=1
- - - indicating missing PDU with SN=2
NACK_SN=2
E1=1
E2=0
- - - indicating missing 10-40 bytes of PDU with SN=3
NACK_SN=3
E1=0
E2=1
SOstart=10
SOend=40
E2=1
- - - indicating missing 100-120 bytes of PDU with SN=3
SOstart=100
SOend=120
E2=0

It can be seen that the STATUS PDU includes only one NACK_SN field (NACK_SN=3) for indicating the missing AMD PDU with SN=3 even there are two missing portions (10-40 bytes and 100-120 bytes) in the AMD PDU with SN=3. Therefore, in comparison with the prior art which uses a STATUS PDU including two identical NACK_SN fields (NACK_SN=3) for indicating two missing portions of the-same AMD PDU (with SN=3), the use of the inventive enhanced STATUS PDU can significantly reduce the amount of data to be transmitted for status reporting, thereby saving the precious bandwidth.

In addition to using the 10-bit absolute SN value in the Negative Acknowledgement SN (NACK_SN) field for indicating the missing AMD PDU, as shown in FIG. 3(B), another approach is to use the offset to the ACK_SN in the NACK_SN_Offset (Negative Acknowledge SN Offset) field to indicate the position of the missing AMD PDU. At the receiver 22 side, the offset to the ACK_SN in the STATUS PDU could be calculated as NACK_SN_Offset=ACK_SN—SN of the detected missing PDU. Then at the sender 21 side, the SN of the missing PDUs could be resulted from ACK_SN and NACK_SN_Offset, i.e., SN=ACK_SN—NACK_SN_Offset, after receiving the STATUS PDU from the receiver. With such an offset representation, only 9 bits will be needed to represent the SN of the missing AMD PDU, thereby further reducing the amount of data to be transmitted for status reporting.

Figure 5:
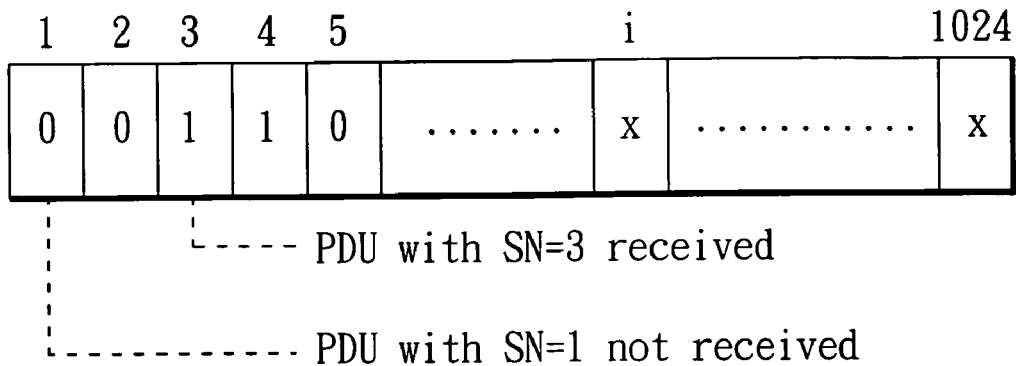
FIG. 5 schematically illustrates a bitmap for status reporting.

In addition to having the Extension bit 1 (E1) field of length=1 bit for indicating whether a set of NACK_SN, E1 and E2 follows or not, an alternative approach is to define an Extension bit 1 (E1) field of length=2 bits for indicating that, as shown in FIG. 4, a set of NACK_SN, E1 and E2 fields does not follow when E1 is 00, indicating that a bitmap for status reporting follows when E1 is 01, indicating that a set of NACK_SN, Nr_NACK_PDU and E1 fields follows when E1 is 10, and indicating that a set of NACK_SN, E1 and E2 fields follows when E1 is 11. It is noted that the definitions for the two-bit E1=00 and E1=11 are equivalent to those for the previous one-bit E1=0 and E1=1, while the bitmap for status reporting is a known status reporting scheme employed in the UMTS specification. For example, as shown in FIG. 5, the bitmap may have 1024 bits corresponding to AMD PDU with SN=1 to 1024, wherein the i-th bit with a value of 0 indicates a missing AMD PDU with SN=i while the i-th bit with a value of 1 indicates that the AMD PDU with SN=i is received correctly. It is to be appreciated that the designated values of the above fields are arbitrary and are presented here in specific values for illustrative purpose only.

For the two-bit E1=10, the 9-bit Nr_NACK_PDU is defined as number of the consecutive missing AMD PDUs followed from this NACK_SN AMD PDU or as number of the consecutive missing AMD PDUs started from this NACK_SN. In this preferred embodiment, the Nr-NACK_PDU is defined as number of the consecutive missing AMD PDUs followed from this NACK_SN AMD PDU. In case if consecutive AMD PDUs are missing at the receiver 22, the combination could indicate the missing AMD PDUs efficiently. With such a two-bit E1 field, an example is given as follows for illustration. A sender 21 transmits ten AMD PDUs with SN=1 to 10 to a receiver 22 and the AMD PDUs with SN=2 to 9 are not received at the receiver 22; i.e., only the AMD PDUs with SN=1, 10 are correctly received. The receiver 22 will respond a STATUS PDU as follows for indicating the missing of AMD PDUs:
D/C=1
CPT=000
ACK_SN=11
E1=10
- - - indicating missing consecutive PDUs with SN=2-9
NACK_SN=2
Nr_NACK_PDU=7
E1=00

The Nr_NACK_PDU given in the example indicates the number of the consecutive missing AMD PDUs followed from the NACK_SN AMD PDU. The Nr_NACK_PDU value is equal 8 in the above example if it indicates the number of the consecutive missing AMD PDUs started from the NACK_SN AMD PDU. A further example is given as follows. A sender 21 transmits ten AMD PDUs with SN=1 to 10 to a receiver 22 and the AMD PDUs with SN=2, 3, 5, 7-9, the 10-20 bytes portion of the AMD PDU with SN=4, and the 5-120 bytes portion of the AMD PDU with SN=6 are not received at the receiver 22. The receiver 22 will respond a STATUS PDU as follows for indicating the missing of AMD PDUs:
D/C=1
CPT=000
ACK_SN=11
E1=10
- - - indicating missing consecutive PDUs with SN=2-9
NACK_SN=2
Nr_NACK PDU=7
E1=11
- - - indicating missing 10-20 bytes of AMD PDU with SN=4
NACK_SN=4
E1=11
E2=1
SOstart=10
SOend=20
E2=0
- - - indicating missing 5-120 bytes of AMD PDU with SN=6
NACK_SN=6
E1=00
E2=1
SOstart=5
SOend=120
E2=0

It can be seen that the use of two-bit E1 field for indicating that a set of NACK_SN, Nr_NACK_PDU and E1 fields follows can avoid repeating a plurality of NACK_SN when there are consecutive missing AMD PDUs, thereby saving required bandwidth to transmit the status reporting information.

Figure 6:
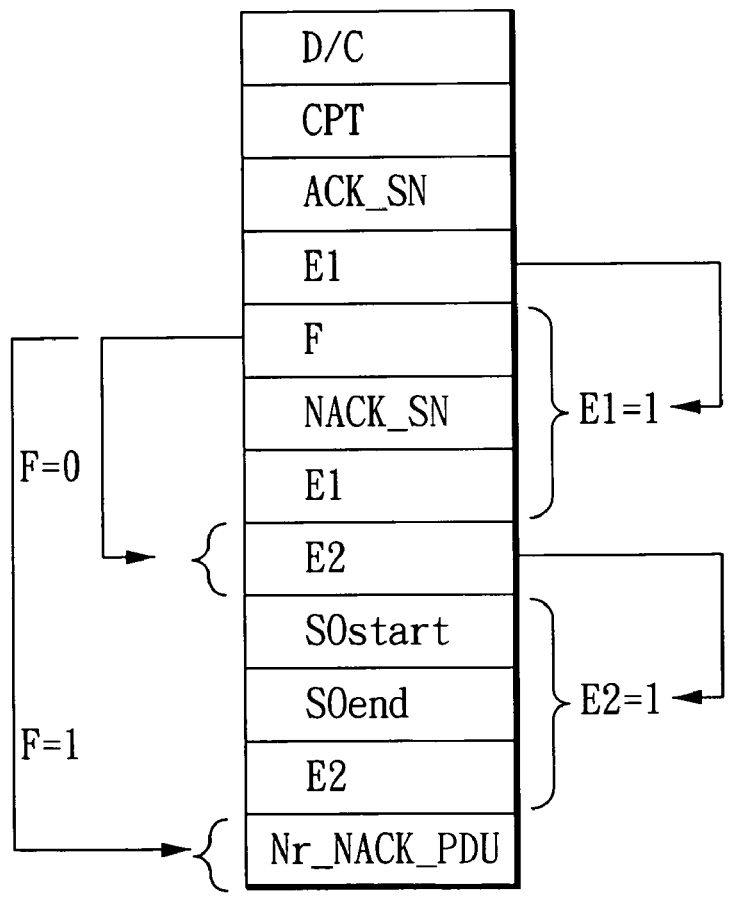
FIG. 6 shows another format of the enhanced STATUS PDU in accordance with the present invention.

As shown in FIG. 6, in addition to having the Extension bit 1 (E1) field of length=1 bit for indicating whether a set of NACK_SN, E1 and E2 fields follows or not, a further alternative approach is to define an Extension bit 1 (E1) field of length=1 bit for indicating that a set of F, NACK_SN and E1 field does not follow when it is 0, and indicating that a set of F, NACK_SN and E1 fields does follow when it is 1, wherein the flag F is provided for indicating that an E2 field follows when it is 0, and indicating that an Nr_NACK_PDU field follows when it is 1. It is to be appreciated that the designated values of the above fields are arbitrary and are presented here in specific values for illustrative purpose only.

With such an E1 field, the receiver 22 may efficiently inform the sender 21 the acknowledgment information of the AMD PDUs received at the receiver 22. For example, a sender 21 transmits ten AMD PDUs with SN=1 to 10 to a receiver 22 and the AMD PDUs with SN=2 to 9 are not received at the receiver.22; i.e., only the AMD PDUs with SN=1, 10 are correctly received. The receiver 22 will respond a STATUS PDU as follows for indicating the missing of AMD PDUs:
D/C=1
CPT=000
ACK SN=11
E1=1
- - - indicating missing consecutive PDUs with SN=2-9
F=1
NACK_SN=2
Nr_NACK PDU=7
E1=0

Another example is given as follows for illustration. A sender 2-1 transmits ten AMD PDUs with SN=1 to 10 to a receiver 22 and the AMD PDU with SN=2 is not received at the receiver 22. The receiver 22 will respond a STATUS PDU as follows for indicating the missing of AMD PDU:
D/C=1
CPT=000
ACK_SN=11
E1=1
- - - indicating missing PDU with SN=2
F=0
NACK_SN=2
E2=0

It can be seen that the use of the E1 field for indicating whether a set of F, NACK_SN and E1 fields follows or not can also avoid repeating a plurality of NACK_SN when there are consecutive missing AMD PDUs, thereby saving required bandwidth to transmit the status reporting information.

Although the present invention has been explained in relation to its preferred embodiment, it is to be understood that many other possible modifications and variations can be made without departing from the spirit and scope of the invention as hereinafter claimed.

What is claimed is:

1. A wireless communication network comprising:
a transmitter; and
a receiver,
wherein a radio link is established between the transmitter and the receiver to transmit and receive data units having an enhanced RLC (Radio Link Control) STATUS PDU (Protocol Data Unit) format that saves bandwidth required to transmit acknowledgment information and effectively transmits status reporting information for controlling the radio link, in which the transmitter transmits AMD (Acknowledge Mode Data) PDUs, each said AMD PDU having an SN (Sequence Number), from the transmitter to the receiver over said radio link, and the receiver responds over said radio link with a STATUS PDU to the transmitter for informing the transmitter of acknowledge information of the AMD PDUs received at the receiver,
wherein the enhanced RLC STATUS PDU format includes:
an ACK_SN field, for indicating the SN of a next AMD PDU which is not received and not reported as missing in the STATUS PDU; and
an E1 (Extension Bit 1) field, for indicating that a set of NACK_SN_Offset, E1, and E2 (Extension Bit 2) fields does not follow when it is a first value, or indicating that the set of NACK_SN_Offset, E1, and E2 fields follows when it is a second value;
wherein for the set of NACK_SN_Offset, E1, and E2 fields that follows the E1 field of second value, the NACK_SN_Offset field is provided for indicating an offset to the ACK_SN of an AMD PDU that has been detected as lost at the receiver, and the E2 field is provided for indicating that a set of SOstart (Segmentation Offset start), SOend (Segmentation Offset end), and E2 fields does not follow for the NACK_SN_Offset when it is the first value, or indicating that a set of SOstart, SOend, and E2 fields follows for the NACK_SN_Offset when it is the second value;
wherein for the SOstart, SOend, and E2 fields that follows the E2 field of second value, the SOstart field is provided for indicating a position of the first byte in the portion of the AMD PDU in bytes within a data field of the AMD PDU with SN resulting from ACK_SN and NACK_SN_Offset, to which the SOStart is related, that has been detected as lost at the receiver, and the SOend field is provided for indicating a position of the last byte in the portion of the AMD PDU in bytes within a data field of the AMD PDU with SN resulting from ACK_SN and NACK_SN_Offset, to which the SOend is related, that has been detected as lost at the receiver; and
wherein the offset to the ACK_SN is calculated as NACK SN_Offset =ACK_SN−SN of the AMD PDU that has been detected as lost at the receiver so that only 9 bits rather than 10 bits are needed to represent the SN of the missing AMD PDU.

2. The wireless communication network of claim 1, wherein the SN resulting from ACK_SN and NACK_SN_Offset is calculated as SN=ACK SN−NACK SN Offset.

3. The wireless communication network using an enhanced RLC of claim 1, wherein the RLC STATUS PDU format further comprises, before the ACK SN field:
a D/C (Data/Control) flag, for indicating whether the PDU is the AMD PDU or a control PDU; and
a CPT (Control PDU Type) field, for indicating the type of control PDU.

4. The wireless communication network using of claim 1, wherein the E1 field has one bit, and the first value and the second value are 0 and 1, respectively.

5. A wireless communication network comprising:
a transmitter; and
a receiver,
wherein a radio link is established between the transmitter and the receiver to transmit and receive data units having an enhanced RLC (Radio Link Control) STATUS PDU (Protocol Data Unit) format that saves bandwidth required to transmit acknowledgment information and effectively transmits status reporting information for controlling the radio link, in which a sender the transmitter transmits AMD (Acknowledge Mode Data) PDUs, each said AMD PDU having an SN (Sequence Number), from the transmitter to a-the receiver over said radio link, and the receiver responds over said radio link with a STATUS PDU to the transmitter for informing the transmitter of acknowledge information of the AMD PDUs received at the receiver, wherein the enhanced RLC STATUS PDU format includes:

an ACK_SN field, for indicating the SN of a next AMD PDU which is not received and not reported as missing in the STATUS PDU;

an E1 (Extension Bit 1) field, for indicating that a set of NACK_SN, E1, and E2 (Extension Bit 2) fields does not follow when it is a first value, indicating that the set of NACK_SN, E1, and E2 fields follows when it is a second value, indicating that a bitmap follows when it is a third value, or indicating that a set of NACK_SN, Nr_NACK_PDU (Number of NACK PDU) and E1 fields follows when it is a fourth value; and a set of NACK_SN, Nr_NACK_PDU and E1 fields that follows the E1 field of the fourth value, in which the Nr NACK PDU indicates the number of consecutive missing AMD PDUs following from or starting from the AMD PDU indicated by the NACK_SN field; wherein for the set of NACK_SN, E1, and E2 fields that follows the E1 field of second value, the NACK_SN field is provided for indicating the AMD PDU that has been detected as lost at the receiver, and the E2 field is provided for indicating that a set of SOstart (Segmentation Offset start), SOend (Segmentation Offset end), and E2 fields does not follow for the NACK_SN when it is the first value, or indicating that a set of SOstart, SOend, and E2 fields follows for the NACK SN when it is the second value; and wherein for the SOstart, SOend, and E2 fields that follows the E2 field of second value, the SOstart field is provided for indicating a position of the first byte in the portion of the AMD PDU in bytes within a data field of the AMD PDU with SN=NACK_SN, to which the SOStart is related, that has been detected as lost at the receiver, and the SOend field is provided for indicating a position of the last byte in the portion of the AMD PDU in bytes within a data field of the AMD PDU with SN=NACK_SN, to which the SOend is related, that has been detected as lost at the receiver.

6. The wireless communication network of claim 5, wherein the enhanced RLC STATUS PDU format further bitmap that follows the E 1 field of third value, wherein the bitmap has N bits corresponding to AMD PDUs with SN=1 to N, where the i-th bit with a value of 0 indicates a missing AMD PDU and the i-th bit with a value of 1 indicates that the AMD PDU with SN=1 is received correctly.

7. The wireless communication network of claim 6, wherein the E1 field has two bits, and the first, second, third and fourth values are 00, 11, 01 and 10, respectively.

8. The wireless communication network format of claim 5, wherein the RLC STATUS PDU format further comprises, before the ACK SN field:

a D/C (Data/Control) flag, for indicating whether the PDU is the AMD PDU or a control PDU; and a CPT (Control PDU Type) field, for indicating the type of control PDU.

9. The wireless communication network of claim 5, wherein the NACK SN field indicates the SN of an AMD PDU or a portion thereof that has been detected as lost at the receiver.

10. A wireless communication network comprising:
a transmitter; and
a receiver,
wherein a radio link is established between the transmitter and the receiver to transmit and receive data units having an enhanced RLC (Radio Link Control) STATUS PDU (Protocol Data Unit) format that saves bandwidth required to transmit acknowledgment information and effectively transmits status reporting information for controlling the radio link, in which a sender the transmitter transmits AMD (Acknowledge Mode Data) PDUs, each said AMD PDU having an SN (Sequence Number), from the transmitter to the receiver over said radio link, and the receiver responds over said radio link with a STATUS PDU to the transmitter for informing the transmitter of acknowledge information of the AMD PDUs received at the receiver, wherein the enhanced RLC STATUS PDU format includes:

an ACK_SN field, for indicating the SN of a next AMD PDU which is not received and not reported as missing in the STATUS PDU; and an E1 (Extension Bit 1) field, for indicating that a set of F (flag), NACK_SN, and E1 fields does not follow when it is a first value, or indicating that the set of F, NACK_SN, and E1 fields follows when it is a second value;

wherein for the set of F, NACK_SN, E1, and E2 fields that follows the E1 field of 1, the F field is provided for indicating that an E2 (extension Bit 2) field follows when it is the first value, or indicating an Nr_NACK_PDU field (Number of NACK PDU) field follows when it is the second value, and the NACK_SN field is provided for indicating the SN of a-an AMD PDU or a portion thereof that has been detected as lost at the receiver the AMD PDU that has been detected as lost at the receiver;

wherein the E2 field that follows the F field of the first value indicates that a set of SOstart (Segmentation Offset start), SOend (Segmentation Offset end), and E2 fields does not follow for the NACK_SN when it is the first value, or indicating that a set of SOstart, SOend, and E2 fields follows for the NACK SN when it is the second value;

wherein the SOstart field is provided for indicating a position of the first byte in the portion of the AMD PDU in bytes within a data field of the AMD PDU with SN=NACK_SN, to which the SOStart is related, that has been detected as lost at the receiver, and the SOend field is provided for indicating a position of the last byte in the portion of the AMD PDU in bytes within a data field of the AMD PDU with SN=NACK_SN, f-err-to which the SOend is related m, that has been detected as lost at the receiver;

and wherein the Nr NACK PDU field that follows the F field of second value indicates the number of consecutive missing AMD PDUs following from or starting from the AMD PDU indicated by the NACK_SN field.

11. The wireless communication network of claim 10, wherein the RLC STATUS PDU format further comprises:

a D/C (Data/Control) flag, for indicating whether the PDU is the AMD PDU or a control PDU; and a CPT (Control PDU Type) field, for indicating the type of control PDU.

12. The wireless communication network of claim 11, wherein the F field has one bit, and the first value is 0 and the second value is 1.

* * * * *